United States Patent
Braedt et al.

(10) Patent No.: US 11,814,137 B2
(45) Date of Patent: Nov. 14, 2023

(54) REAR WHEEL SPROCKET ARRANGEMENT

(71) Applicant: SRAM DEUTSCHLAND GmbH, Schweinfurt (DE)

(72) Inventors: Henrik Braedt, Hambach (DE); Matthias Reinbold, Würzburg (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 1428 days.

(21) Appl. No.: 16/038,970

(22) Filed: Jul. 18, 2018

(65) Prior Publication Data

US 2018/0319458 A1 Nov. 8, 2018

Related U.S. Application Data

(63) Continuation of application No. 15/085,570, filed on Mar. 30, 2016, now Pat. No. 10,053,186.

(30) Foreign Application Priority Data

Mar. 30, 2015 (DE) .................... 10 2015 205 736.4

(51) Int. Cl.
*B62M 9/10* (2006.01)
*B25B 27/00* (2006.01)
*F16H 55/30* (2006.01)
*B62M 9/02* (2006.01)
*B62M 9/12* (2006.01)

(52) U.S. Cl.
CPC ........... *B62M 9/10* (2013.01); *B25B 27/0071* (2013.01); *F16H 55/30* (2013.01); *B62M 9/12* (2013.01)

(58) Field of Classification Search
CPC ....... B62M 9/10; B62M 9/12; B25B 27/0071; F16H 55/30
USPC ........................................................ 474/160
See application file for complete search history.

(56) References Cited

U.S. PATENT DOCUMENTS

| 3,748,916 A | 7/1973 | Morse |
| 4,268,259 A | 5/1981 | Segawa et al. |
| 5,954,604 A * | 9/1999 | Nakamura ............. F16G 13/06 474/158 |
| 6,264,575 B1 | 7/2001 | Lim et al. |
| 6,340,338 B1 | 1/2002 | Kamada |

(Continued)

FOREIGN PATENT DOCUMENTS

| AU | 2011201317 | 10/2012 |
| DE | 3604876 | 8/1986 |

(Continued)

*Primary Examiner* — Henry Y Liu

(57) ABSTRACT

A plurality of sprockets which are coaxial with respect to a sprocket rotation axis, are arranged with axial spacing from each other and have different numbers of teeth which are constructed for positive-locking engagement with a bicycle chain. The pinion arrangement has a gear range quotient which is formed by division of the number of teeth of the sprocket having the largest diameter by the number of teeth of the sprocket having the smallest diameter, and has a packing density quotient which is formed by division of the number of sprockets in the sprocket arrangement by the axial spacing measured in millimeters of the axially outermost pinions from each other. The pinion arrangement may have a gear range packing coefficient, formed from the product of the gear range quotient and the packing density quotient, which is greater than 1.25.

18 Claims, 6 Drawing Sheets

(56) References Cited

U.S. PATENT DOCUMENTS

| | | | |
|---|---|---|---|
| 7,131,656 B2* | 11/2006 | Valle | B62M 9/10 280/260 |
| 8,096,908 B2 | 1/2012 | Oishi et al. | |
| 8,100,795 B2* | 1/2012 | Reiter | B62M 9/10 474/160 |
| 8,834,309 B2 | 9/2014 | Braedt | |
| 8,905,878 B2* | 12/2014 | Loy | B62M 9/10 474/160 |
| 8,911,314 B2* | 12/2014 | Braedt | B62M 9/10 474/160 |
| 9,011,282 B2* | 4/2015 | Staples | B62M 9/10 474/160 |
| 9,868,491 B1* | 1/2018 | Oishi | B62M 9/10 |
| 9,994,285 B2* | 6/2018 | Tokuyama | F16H 55/30 |
| 10,377,174 B2* | 8/2019 | Fujita | B60B 27/0021 |
| 10,525,768 B2* | 1/2020 | Komatsu | B60B 27/023 |
| 2001/0041641 A1 | 11/2001 | Mercat et al. | |
| 2004/0121867 A1* | 6/2004 | Reiter | B62M 9/10 474/160 |
| 2006/0128511 A1 | 6/2006 | Oishi et al. | |
| 2008/0188336 A1* | 8/2008 | Tokuyama | B62M 9/10 474/160 |
| 2009/0042680 A1 | 2/2009 | Valle | |
| 2011/0105263 A1 | 5/2011 | Braedt | |
| 2012/0208662 A1 | 8/2012 | Braedt | |
| 2012/0225745 A1* | 9/2012 | Oishi | B62M 9/121 474/160 |
| 2012/0309572 A1 | 12/2012 | Braedt | |
| 2014/0128191 A1 | 5/2014 | Bohm | |
| 2015/0094181 A1* | 4/2015 | Fukumori | F16G 13/06 474/206 |
| 2015/0243019 A1 | 8/2015 | Hall et al. | |
| 2015/0308542 A1* | 10/2015 | Fukumori | B62M 9/00 474/230 |
| 2016/0167737 A1* | 6/2016 | Tokuyama | B62M 9/10 474/160 |
| 2016/0272002 A1* | 9/2016 | Earle | B60B 1/041 |
| 2017/0029066 A1* | 2/2017 | Fukunaga | F16H 55/303 |
| 2017/0233037 A1 | 8/2017 | Hara | |

FOREIGN PATENT DOCUMENTS

| | | |
|---|---|---|
| DE | 3810974 | 12/1988 |
| DE | 19629602 | 1/1998 |
| DE | 102011010855 | 8/2012 |
| DE | 202012006903 | 8/2012 |
| DE | 102011103489 | 12/2012 |
| DE | 102012204452 | 9/2013 |
| DE | 102014018568 | 12/2014 |
| EP | 1043221 | 10/2000 |
| EP | 1188658 | 3/2002 |
| EP | 1609716 | 12/2005 |
| EP | 1671880 | 6/2006 |
| EP | 2022712 | 2/2009 |
| EP | 2048075 | 4/2009 |
| GB | 2171474 | 8/1986 |

* cited by examiner

REAR WHEEL SPROCKET ARRANGEMENT

This application is a Continuation of U.S. Utility patent application Ser. No. 15/085,570, filed Mar. 30, 2016, which claims priority to and/or the benefit of German Patent Application No DE 10 2015 205 736.4, filed on Mar. 30, 2015 the contents of which are included by reference in their entirety.

FIELD OF THE INVENTION

The invention relates to a bicycle rear wheel sprocket arrangement which can be rotated about a sprocket rotation axis, comprising a plurality of sprockets which are coaxial with respect to the sprocket rotation axis, are arranged with axial spacing from each other, and have different numbers of teeth which are constructed for positive-locking engagement with a bicycle chain.

BACKGROUND

Bicycle rear wheel sprocket arrangements are generally known as bicycle components. They are used, for example, in the tourer bicycles, racing bicycles and in the mountain bike sectors at locations where derailleur mechanism gears are provided in bicycles in order to bring about different transmission ratios from the tread crank to the rear wheel. In this instance, the number of sprockets on the rear wheel has increased over time in order to graduate transmission ratios more and more finely. This fineness of the graduation was even further supported by an increasing number of chain rings on the tread crank.

Recently, there has been perceived a development tendency which again reduces the number of chain rings which are directly connected to the tread crank. This may lead to singular derailleur mechanisms in which only a single chain ring is provided on the tread crank. With the reduction in the number of chain rings, the number of sprockets in the rear wheel sprocket arrangement and the tooth number graduation thereof assumes increasing importance for producing desired transmission ratios.

Reference may be made to the publication U.S. Pat. No. 3,748,916 A of Morse by way of example of a bicycle rear wheel sprocket arrangement of the generic type for a single derailleur mechanism. This publication discloses a bicycle rear wheel sprocket arrangement with a total of 5 sprockets, of which the smallest may have 9 and the largest may have 45 teeth. Consequently, that sprocket arrangement has a gear range quotient of 45:9=5. Consequently, the gear range quotient is a measurement for the bandwidth of transmission ratios which can be produced with a sprocket arrangement. The greater the value of the gear range quotient, the greater the bandwidth of transmission ratios which can be produced.

The technically most advanced prior art in the field of single derailleur mechanisms may currently be a system which is marketed by SRAM under the name "XX1". This system with a rear wheel sprocket arrangement comprising 11 sprockets has a gear range quotient of 4.2.

Reference is further made as additional prior art to EP 2 022 712 A of Campagnolo, which discloses a 12 sprocket arrangement whose smallest sprocket has 11 teeth and whose largest sprocket has 27 teeth. The gear range quotient of that sprocket arrangement is, at 2.45, slightly less than half as large as that of the sprocket arrangement of the previously discussed US patent.

Reference may be made to U.S. Pat. No. 5,954,604 A as another extreme example of a multiple sprocket arrangement which sets out a sprocket arrangement having 14 sprockets. FIG. 13 of this publication shows an embodiment in which the smallest sprocket of the sprocket arrangement has 11 teeth and the largest sprocket has 39 teeth. Therefore, the gear range quotient of that known sprocket arrangement is 3.54.

In a more comprehensible manner, the number of sprockets in the sprocket arrangement gives a measurement of the fineness of the graduation of the transmission ratios which can be achieved with a rear wheel sprocket arrangement. The higher the number of sprockets, the finer the graduation of the adjustable transmission ratios can be.

However, there is only limited structural space available for the arrangement of the rear wheel sprocket arrangement on a rear wheel hub. Because of this limited structural space the number of sprockets in the sprocket arrangement cannot be freely increased. Therefore, the packing density quotient mentioned in the introduction directly gives a measurement of how effectively the structural space present on the rear wheel hub is used for the arrangement of sprockets. Indirectly, the packing density quotient is also a measurement concerning the fineness of the graduation of the achievable transmission ratios because it contains in the numerator information relating to the number of sprockets in the rear wheel sprocket arrangement. Again, the following applies: the higher the packing density quotient, the more effective is the use of structural space for the arrangement of sprockets. Similar to the gear range quotient, the packing density quotient is a dimensionless numerical value, for the establishment of which only the numerical value of the spacing measured in millimeters ("mm") between the axially outermost sprockets should be used.

The 5 sprocket arrangement known from U.S. Pat. No. 3,748,916 A takes up, for example, an axial structural space of approximately 26 mm. Consequently, the packing density quotient purely as a numerical value variable of this sprocket arrangement is 0.192.

In comparison, EP 2 022 712 A for the 12 sprocket arrangement, the implementation of which is not demonstrated in the publication, however, sets out an axial structural space requirement of 40.5 mm. This results in a packing density quotient of 0.296.

The above-mentioned single derailleur system "XX1" of the same Applicant has, with 11 sprockets in a structural space of 38.4 mm, a packing density quotient of 0.286.

Finally, reference may be made as an additional comparison to the above-mentioned U.S. Pat. No. 5,954,604 A in which 14 sprockets of a sprocket arrangement are received with an axial spacing of the outermost sprockets which axially measures approximately 50 mm, which results in a packing density quotient of approximately 0.28.

As evidenced herein, modern rear wheel sprocket arrangements have a packing density quotient of slightly below 0.3. This sets out the current state of axial structural space use on rear wheel hubs.

SUMMARY AND DESCRIPTION

In an embodiment, a bicycle rear wheel sprocket arrangement which can be rotated about a sprocket rotation axis includes a plurality of sprockets which are coaxial with respect to the sprocket rotation axis and are arranged with axial spacing from each other and have different numbers of teeth which are constructed for positive-locking engagement with a bicycle chain. The plurality of sprockets having a gear range quotient which is formed by division of the number of teeth of a sprocket of the plurality of sprockets having the largest diameter by the number of teeth of a sprocket of the plurality of teeth having the smallest diameter. The plurality of sprockets also having a packing density quotient which is formed by division of the number of sprockets in the sprocket arrangement by the axial spacing measured in millimeters of the axially outermost sprockets from each other. The plurality of sprockets may have a gear range packing coefficient, formed from the product of the gear range quotient and the packing density quotient, which is greater than 1.25.

DETAILED DESCRIPTION OF THE DRAWINGS

Figure 1:
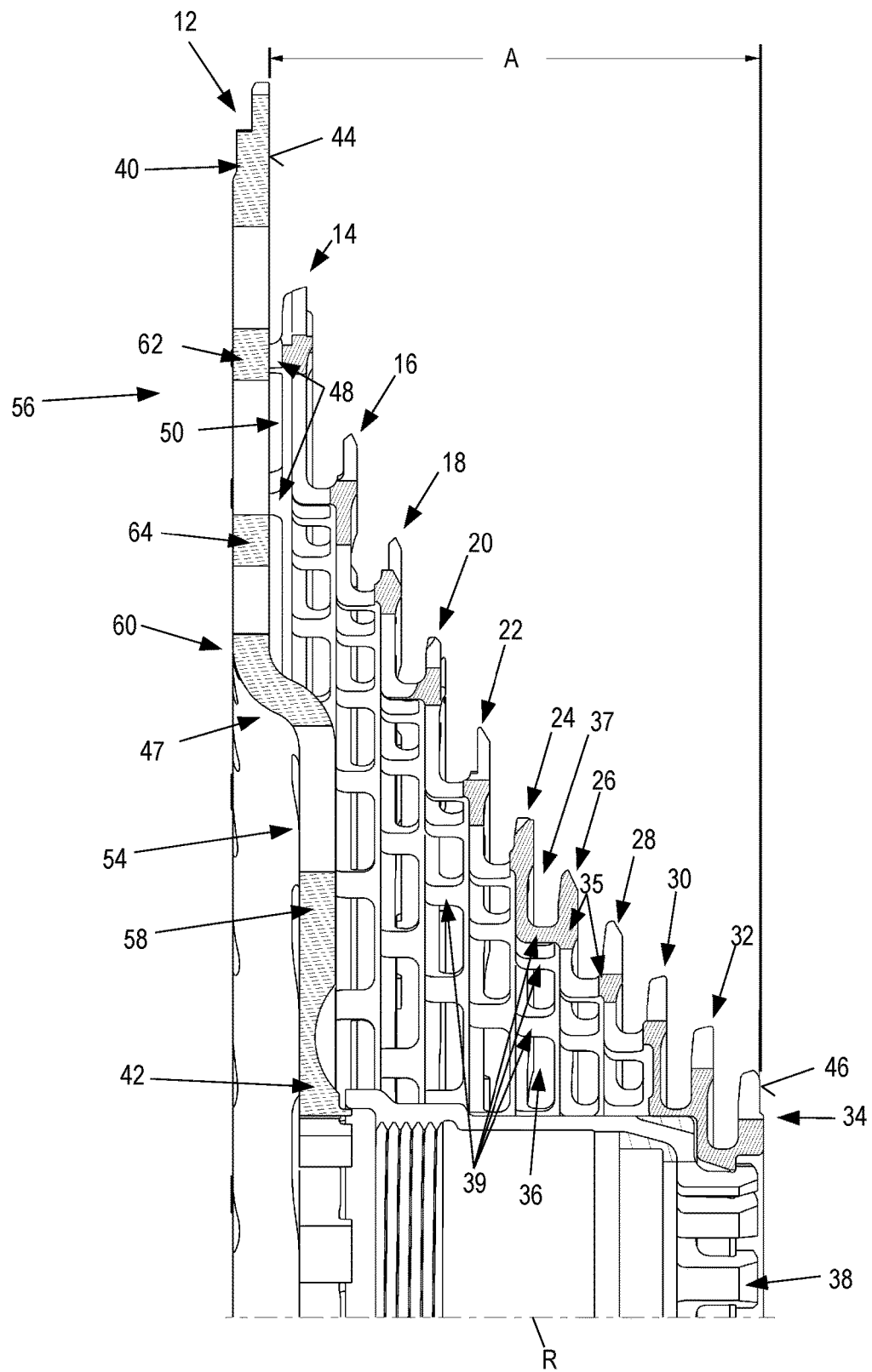
FIG. 1 is a longitudinal sectioned view of an embodiment according to the invention of a bicycle rear wheel sprocket arrangement in a plane of section which contains the sprocket rotation axis.

A bicycle rear wheel sprocket arrangement can be rotated about a sprocket rotation axis, comprising a plurality of sprockets which are coaxial with respect to the sprocket rotation axis. The sprockets are arranged with axial spacing from each other and have different numbers of teeth which are constructed for positive-locking engagement with a bicycle chain. The sprocket arrangement may have a gear range quotient which is formed by division of the number of teeth of the sprocket having the largest diameter by the number of teeth of the sprocket having the smallest diameter. The sprocket arrangement may have a packing density quotient which is formed by division of the number of sprockets in the sprocket arrangement by the axial spacing measured in millimetres of the axially outermost sprockets from each other.

During the establishment of the packing density quotient, an important aspect is the manner in which the axial spacing of the axially outermost sprockets from each other is established. This axial distance is, generally, an axial distance between the sprocket having the largest diameter and the sprocket having the smallest diameter. In principle, it is possible to use the sprocket center planes which are orthogonal to the sprocket rotation axis as reference planes for establishing the spacing.

For the production of switching operations in the rear wheel sprocket arrangement, the positioning of the ratchet gears relative to the rear wheel sprocket arrangement is orientated with respect to the front faces of the individual sprockets. The front faces of the sprockets are directed away from the bicycle longitudinal center plane in the assembled state, however, the axial front faces of the individual sprockets are preferably used as reference faces for establishing the spacing. In this instance, the front face should be used at the sprocket having the largest diameter at the side which the next-smallest sprocket is opposite. At the sprocket having the smallest diameter, the front face which is directed away from the sprocket having the largest diameter should be used. If a sprocket is provided with an angled portion at the rear wheel hub for reasons of the most effective use possible of the structural space provided for the fitting thereof, the front face portion nearest the tooth ring of the sprocket should be decisive. Therefore, the spacing of the axially outermost sprockets from each other is preferably the axial spacing of the front faces of those sprockets from each other.

In the case of doubt as to what should be determined as the front face, the face or face portion of a sprocket with which the sprocket at the relevant side is positioned on a planar level is a front face of the sprocket. If the sprocket has individual teeth which project axially beyond the front face—for instance, acting as switching support teeth—those teeth should not be taken into consideration when the front face is established. Such "exceptional teeth" which project axially beyond the front face are known, for example, from EP 1 671 880 A.

The overview set out above of different existing rear wheel sprocket arrangements shows that existing sprocket arrangements either offer a large bandwidth of transmission ratios, but they are then graduated in a relatively coarse manner and distributed over a relatively large axial structural space, or the existing sprocket arrangements offer a very fine graduation of relatively narrow bandwidths of transmission ratios, but then with very effective use of the axial structural space available.

The existing sprocket arrangements for bicycle rear wheels may no longer comply in each case with the increasing demands placed on them. In view of the most recent technical trends in the development of bicycle components, it is no longer sufficient to graduate bandwidth of transmission ratios only in a very coarse manner or to offer only a small bandwidth of transmission ratios. In particular, but not only, in the case of a single derailleur mechanism having only one chain ring, a large bandwidth of transmission ratios which is graduated in a relatively fine manner and which has space in conventional bicycle constructions is required on the rear wheel. For this purpose, a new class of bicycle rear wheel sprocket arrangements is required.

The embodiments presented herein meet these requirements on modern bicycle rear wheel sprocket arrangements by providing a bicycle rear wheel sprocket arrangement of the type mentioned in the introduction which has a gear range packing coefficient which is greater than 1.25.

In this instance, the gear range packing coefficient is the product of the gear range quotient and packing density quotients already discussed above. The gear range packing coefficient is a measurement for which bandwidth of transmission ratios is provided, with what graduation for use in the axial structural space on the rear wheel hub. The higher the gear range packing coefficient is the greater is the bandwidth of transmission ratios. Also, the finer is the graduation of this bandwidth, the less axial structural space is required for using the sprocket arrangement.

By way of comparison, the gear range packing coefficient of the sprocket arrangement known from U.S. Pat. No. 3,748,916 A is approximately 0.96. The gear range packing coefficient of the 12 sprocket arrangement known from EP 2 022 712 A is approximately 0.72. The gear range packing coefficient of the rear wheel sprocket arrangement which is known from U.S. Pat. No. 5,954,604 A, and which has 14 sprockets, is approximately 0.991.

The gear range packing coefficient of the above described "XX1" system is 1.20.

With the new class of rear wheel sprocket arrangements, in which the gear range packing coefficient is greater than 1.25, it is possible to provide on rear wheel sprocket arrangements large bandwidths of transmission ratios with a large number of sprockets in a small axial structural space in a manner graduated relatively finely. Therefore, the gear range packing coefficient of a sprocket arrangement according to embodiments presented herein may be even greater than 1.3, particularly preferably even greater than 1.35. It is easy to see that, with increasing values of the coefficient discussed here, the ride comfort provided by the relevant sprocket arrangements also increases with regard to transmission ratio bandwidth and graduation so that, in conjunction with tests carried out by the Applicant, sprocket arrangements having a gear range packing coefficient greater than 1.4 are also available. As set out below with reference to a presented embodiment, a gear range packing coefficient of 1.48 is provided.

With gear range packing coefficients greater than 1.25, a prerequisite of reducing chain loads which occur during operation of a bicycle, more precisely chain tensile loads, is further met. Advantageous effects are connected with the reduction of the chain tensile loads, such as a reduction of the friction which acts within the bicycle chain or also between the bicycle chain and an engagement element (e.g. a sprocket or a chain ring), and a reduction in resulting wear which occurs on the bicycle chain and engagement elements. Furthermore, a reduction of the maximum chain tensile load brings about a reduction of the deformation of the bicycle frame during operation as a result of chain tensile loads which change periodically with the turning of the tread crank.

Rear wheel sprocket arrangements with gear range packing coefficients greater than 1.25 are primarily achieved by using sprockets having the largest diameter with very high numbers of teeth so that the load arm of those sprockets having the largest diameter is greater than the load arm of comparable sprockets of existing and known sprocket arrangements. For the same torque introduced into the rear running wheel, a smaller force, that is to say, a smaller chain load, is required for the larger load arm.

Rear wheel sprockets having a larger diameter allow the use of chain rings having a larger diameter, without the transmission ratio of the tread cranks with respect to the rear wheel being made worse. Quite the reverse: as a result of a sub-proportional increase of the diameter of the chain ring—in comparison, for instance, with existing single derailleur systems—in relation to the increase of the diameter of the sprocket having the largest diameter, not only can the chain load occurring during operation be reduced but at the same time the bandwidth of the torque transmission from the tread cranks to the rear wheel can be increased.

With increasing values of the gear range packing coefficient, structural problems with respect to the sprocket arrangements may have to be solved, which will be discussed in greater detail below. For example, the sprocket having the largest diameter may take up diameters at which the load applied to the sprocket by the bicycle chain results in a noteworthy flexural loading of the sprocket. This applies to an even greater extent if the bicycle chain running on the sprocket having the largest diameter may have a given oblique position relative to the bicycle longitudinal center plane because in an embodiment the sprocket having the largest diameter is an axially innermost sprocket of the sprocket arrangement, whereas a front chain ring sprocket arrangement may have a largest diameter sprocket at an axially outermost location thus potentially causing a flexural loading of the rear sprocket arrangement when both such sprockets are engaged. Other chain engagement may also cause flexural loading.

Similarly, an approach of the bicycle chain towards the next-largest sprocket up to abrasive contact of the chain with this sprocket may have to be overcome on the sprocket having the smallest diameter, again as a result of the oblique position of the bicycle chain running on the sprocket which has the smallest diameter. Such problems may arise, but are not common.

In order to provide the most adequate bandwidth of transmission ratios possible in the bicycle rear wheel sprocket arrangement, it is advantageous if the gear range quotient of the sprocket arrangement is greater than or equal to 4.2. The greater the gear range quotient, the greater the transmission ratio range provided by the sprocket arrangement. Therefore, the gear range quotient may be greater than or equal to 4.5.

In order to avoid difficulties of the sprocket arrangement during operation, such as, for example, those mentioned above, it may be advantageous in some circumstances if the gear range quotient does not exceed the value 6. Difficulties during operation of the sprocket arrangement can be avoided with even greater probability if the gear range quotient is not greater than 5.5.

The best possible use of the structural space available for receiving the sprockets of the sprocket arrangement may be achieved if the packing density quotient of the sprocket arrangement has a value greater than or equal to 0.286. For the reasons mentioned, this value is preferably greater than or equal to 0.290.

In conjunction with the sprocket arrangement as described by the packing density quotient, difficulties during operation of the sprocket arrangement can also occur with excessively high values of the packing density quotient, such as, for example, an undesirable contact of the bicycle chain which meshes with a sprocket with an adjacent sprocket, for instance because they have been moved axially together to an excessive extent. In order to avoid such difficulties during operation, in some cases the packing density quotient should advantageously not be greater than 0.36, wherein the probability of avoiding operating difficulties is even greater at a packing density quotient which does not exceed 0.33.

In an embodiment, in able to provide the most advantageous possible torque transmission from the tread crank to the rear running wheel to overcome gradients, the sprocket having the largest diameter of the sprocket arrangement may have 45 teeth or more. This takes into consideration a specific necessary minimum size of the front chain ring. Greater gradients can be overcome with a sprocket having the largest diameter with at least 48 teeth. In the field of mountain bikes, a sprocket having the largest diameter with at least 50 teeth may be advantageous in order to overcome the challenges encountered by the cyclist.

With respect to hill climbing applications, the axial longitudinal end of the sprocket arrangement is used (i.e. the end that is nearer the sprocket having the largest diameter), and for fast riding a sprocket at the opposite axial longitudinal end at which the sprocket having the smallest diameter is located may be used. In order to be able to provide transmission ratios which are adequate to operate in cooperation with the at least one chain ring on the tread crank, it is advantageously provided that the sprocket having the smallest diameter does not have more than 12 teeth, for example 12 or fewer teeth may be used. Higher travel speeds as a result of an even greater transmission of the muscle power into speed can be achieved by a sprocket having the smallest diameter with no more than 11 teeth. In an embodiment, the sprocket having the smallest diameter has no more than 10 teeth in order to be able to achieve high peak speeds.

In addition to the bandwidth of transmission ratios, the graduation of the bandwidth, which is provided in total by the rear wheel sprocket arrangement, is of interest. In view of the above-described great bandwidth—expressed by the gear range quotient—the rear wheel sprocket arrangement discussed in this instance may offer at least eight additional stages on the basis of an axially outermost sprocket so that the rear wheel sprocket arrangement according to the invention preferably has more than 8 sprockets. The fineness of the graduation also increases with an increasing number of sprockets so that the rear wheel sprocket arrangement discussed in this instance has more than 10 sprockets. In an embodiment the rear sprocket arrangement has more than 11 sprockets.

In an embodiment, the percentage change of the number of teeth does not exceed 20% from one sprocket to the next-largest sprocket of the rear wheel sprocket arrangement, always in relation to the smaller of the two sprockets being considered. In an embodiment, the two largest percentage changes in the number of teeth are brought about at the transition from the sprocket having the smallest diameter to the next-largest sprocket and at the transition from the second-largest sprocket to the sprocket having the largest diameter. In an embodiment, the greatest percentage increase in the number of teeth occurs at the transition from the sprocket having the smallest diameter to the next-largest sprocket. The second-largest percentage change of the number of teeth may then be at the transition from the second-largest sprocket to the sprocket having the largest diameter. In order to achieve the most uniform possible graduation of the achievable transmission ratios in the sprocket range between the sprocket having the smallest diameter and the sprocket having the largest diameter, it may further be advantageous if the percentage changes in the number of teeth between two adjacent sprockets of that sprocket group are not less than 12% and not more than 17%. The value of the percentage change of the number of teeth from one sprocket to the next-largest sprocket of a sprocket arrangement may repeatedly decrease initially and then increase again across the sprocket arrangement from the sprocket having the smallest diameter to the sprocket having the largest diameter.

In the above-discussed peripheral conditions for the sprocket having the largest diameter, the sprocket may reach a relatively large mass and, in a manner connected therewith, a relatively great weight. Since the sprockets are part of the bicycle mass which is intended to be accelerated and slowed, however, a sprocket having the largest diameter with the smallest possible mass is desired. In order to ensure that the muscle power introduced by the cyclist at the tread crank can be transmitted to the rear running wheel in a reliable and durable manner, the sprocket having the largest diameter preferably has at the radially outer side a tooth ring region for transmitting force from the bicycle chain to the sprocket. Similarly, the sprocket having the largest diameter preferably has at the radially inner side a hub region which is used to transmit torque from the sprocket to a rear wheel hub, at which the rear wheel sprocket arrangement is received. In order to reduce the mass being moved, it is then advantageous if there are provided a plurality of sprocket spokes radially between the tooth ring region and the hub region for the connection of those regions in a manner transmitting torque.

In an embodiment, the sprocket having the largest diameter may be provided with the smallest possible mass with dimensional stability which is adequate for operation if the sprocket having the largest diameter has an outer spoke region which is located radially further outwards and has an inner spoke region which is located radially further inwards. In this embodiment, the outer spoke region has a greater number of sprocket spokes than the inner spoke region. For example, the sprocket spokes can be constructed in the inner spoke region so as to have approximately the same cross-sectional area as the sprocket spokes in the outer spoke region.

In order to support the different number of sprocket spokes in the outer and inner spoke region, in an embodiment an intermediate ring region which is solid in the peripheral direction may be constructed between the outer and inner spoke region. The radially outer ends of the sprocket spokes of the inner spoke region and the radially inner ends of the sprocket spokes of the outer spoke region can be supported on that solid intermediate ring region.

In an embodiment, the above-mentioned tooth ring region is also constructed to be solid, that is to say, without interruptions which cut out material on and/or between the teeth of the tooth ring region in order to provide the most uniform conditions possible in a peripheral direction for the torque transmission from the bicycle chain to the sprocket arrangement. In an embodiment, to achieve a more uniform torque transmission from the sprocket arrangement to a rear wheel hub, the above-mentioned hub region is also constructed in a solid manner.

In an embodiment, at least the sprocket having the largest diameter may be constructed to have an angled portion. For example, the sprocket having the largest diameter may be angled in such a manner that the tooth ring thereof has a greater axial spacing from the sprocket having the smallest diameter than an angled sprocket region of the sprocket having the largest diameter, which sprocket region is located radially further inwards. This angled portion may provide, between the tooth ring regions of the axially outermost sprockets which are decisive for the switching operation at the rear wheel sprocket arrangement, a greater axial spacing than at the rear wheel hub for fitting the sprockets. For reasons of stability, this angled portion may be configured in the radial portion of the solid intermediate ring region. In an embodiment, at least the angled portion may overlap with the intermediate ring region in a radial direction. In another embodiment, the angled portion is located completely in the intermediate ring region.

Furthermore, the flexural stability of the sprocket having the largest diameter may be increased by such an angled portion with respect to bending about a bending axis which is orthogonal to the rotation axis of the sprocket.

In an embodiment, the solid intermediate ring region is constructed to be circular at least in a radial portion. For example, there may exist a solid radial portion of the intermediate ring region which has the same radial spacing from the sprocket rotation axis at each point in a peripheral direction.

In order to reinforce the sprocket having the largest diameter, there may further be provision for every second sprocket spoke acting as a connection spoke with respect to the sprocket spoke thereof which is directly adjacent in a predetermined rotation direction to be connected by a connection strut which is located radially between the longitudinal ends of the sprocket spokes in the outer spoke region at least in a peripheral portion, preferably over the entire periphery. Consequently, pairs of sprocket spokes can be connected to each other by the connection strut. In an embodiment, that connection strut may be used to connect the sprocket having the largest diameter to the next-smallest sprocket which is axially directly adjacent. Therefore, there may be provision for the arrangement of the at least one connection strut radially in a region which is radially overlapped by the axially adjacent, next-smallest, sprocket. This arrangement may be provided so that the axially directly adjacent, next-smallest, sprocket has sufficient material for producing a physical connection with respect to the connection strut on the sprocket having the largest diameter without impairing the engagement of the bicycle chain with this sprocket as a result of the physical connection.

It has been found that it is sufficient both for the requisite additional reinforcement of the sprocket which has the largest diameter and for an adequate physical connection of the sprocket having the largest diameter with respect to the axially adjacent, next-smallest sprocket, if only every second sprocket spoke is constructed as a connection spoke in the manner mentioned above. In order to obtain the lowest possible total weight of the sprocket having the largest diameter, therefore, it is preferable for such a connection strut not to be provided between the connection spoke and the sprocket spoke thereof which is adjacent in the rotation direction opposite the predetermined rotation direction.

In an embodiment, a plurality of connection struts, and/or a majority of connection struts, preferably all the connection struts, are spaced apart from the sprocket rotation axis to the same extent.

As indicated above, the sprocket having the largest diameter can be physically connected to the next-smallest sprocket in the region of the connection struts. The connection struts proposed to this end may be located on the sprocket having the largest diameter radially in a very external position, for instance, radially slightly inside the tooth ring of the axially adjacent, next-smallest sprocket. The connection struts are preferably arranged in the radially outermost third of the sprocket having the largest diameter. The total radial extent of the sprocket having the largest diameter is measured, in this embodiment, from the sprocket rotation axis to the radially outermost tooth tip even if the sprocket centrally has a recess.

The construction of the connection mentioned makes the operation of the sprocket having the largest diameter considerably easier because the physical connection of the sprocket having the largest diameter to the axially adjacent, next-smallest sprocket on the connection struts increases the flexural rigidity of the sprocket having the largest diameter in the event of loading with bending about a bending axis orthogonal to the sprocket rotation axis.

In structural terms, the physical connection of the connection struts to the next-smallest sprocket can be brought about by connections which extend between a connection strut and the next-smallest sprocket so as to bridge the axial gap which exists between the sprocket having the largest diameter and the next-smallest sprocket. The connections are configured so as to transmit torque both to the connection strut and to the next-smallest sprocket. In an embodiment, in order to increase the rigidity and dimensional stability of the bicycle rear wheel sprocket arrangement overall, the connections are configured so as to also transmit axial force both to the connection strut and to the next-smallest sprocket.

In an embodiment, for effective transmission of torque from tread cranks to the sprocket having the largest diameter, the sprocket having the largest diameter is constructed in such a manner that for at least one sprocket spoke, for example all the sprocket spokes of a spoke region or for all the sprocket spokes, of the sprocket having the largest diameter, the radially inner longitudinal end thereof leads the radially outer longitudinal end of the same sprocket spoke in a drive rotation direction of the sprocket arrangement.

In an embodiment, in order to prevent undesirable shearing stress peaks and for the most uniform possible load distribution in the at least one sprocket spoke during the torque transmission, the at least one sprocket spoke is constructed to be curved about a curvature axis parallel with the sprocket rotation axis so that it is curved in a concave manner when viewed in a drive rotation direction and in a convex manner when viewed counter to the drive rotation direction. The sprocket spokes of a spoke region of the sprocket having the largest diameter are preferably constructed to be substantially identical—with the exception of the above-mentioned connection spokes which are connected by means of a connection web to the sprocket spoke directly adjacent in a rotation direction.

In an embodiment, in order to increase the stability, in particular dimensional stability, of the sprocket arrangement, there may be provision for the sprocket which is axially directly adjacent to the sprocket having the largest diameter to be constructed separately from the sprocket having the largest diameter but integrally with the axially adjacent sprocket at the side thereof directed away from the sprocket having the largest diameter. The sprocket which is axially directly adjacent to the sprocket having the largest diameter is preferably constructed integrally with a plurality of sprockets which are arranged at the side thereof directed away from the sprocket having the largest diameter.

In very general terms, it may be the case that two axially adjacent sprockets, in particular the sprocket having the largest diameter and the sprocket which is axially directly adjacent thereto, are constructed separately from each other and are connected so as to transmit torque and/or axial force by a plurality of connection means which bridge the axial gap existing between the adjacent sprockets. The connections may be constructed as separate connection means separately from each of the two axially directly adjacent sprockets and may have been connected to each of those sprockets. Alternatively or additionally, some or all connection means may be constructed integrally with one of the two axially directly adjacent sprockets and may have been connected to the other sprocket.

A particularly solid and stable sprocket arrangement can be obtained in that at least two axially directly adjacent sprockets, in particular a sprocket smaller than the sprocket having the largest diameter and the sprocket which is axially directly adjacent thereto, are constructed integrally with each other and are connected so as to transmit torque and/or axial force by a plurality of connections or connection means in the form of webs which bridge the axial gap existing between the adjacent sprockets. In this case, the webs may be constructed as connections in an integral, materially cohesive, manner with respect to each of the two axially directly adjacent sprockets. The webs may be formed, for example, by cutting methods, in particular by milling, from the piece of material forming the sprockets.

In an embodiment, the sprocket arrangement can be formed in a more stable manner the further the connections are arranged radially outwards. The prerequisite for an arrangement of the connections in a position which is as radially external as possible can be achieved when the connections are connected to the smaller of the two axially adjacent sprockets in a peripheral direction at a location at which a tooth is located on the smaller of the two axially adjacent sprockets. Since the tooth projects radially further than an intermediate tooth space region of the tooth ring of the same sprocket, the material contributing to the tooth, for example, a portion of the tooth base, can be used to connect the connection means to the smaller of the two adjacent sprockets, independently of whether the connection means is constructed integrally or separately with respect to the smaller of the two sprockets.

If the torque transmission from the bicycle chain to the rear running wheel is carried out via the sprocket having the largest diameter, the connectors—irrespective of whether they are constructed separately from the sprockets which they connect or integrally therewith—can be constructed to be particularly thin if the longitudinal end thereof which is located nearer the sprocket having the larger diameter leads the opposite longitudinal end, which is located nearer the axially directly adjacent sprocket in the sprocket having the smaller diameter, in the drive rotation direction of the sprocket arrangement.

In an embodiment, a bicycle rear wheel sprocket arrangement which is rotatable about a sprocket rotation axis and which has a plurality of sprockets which are coaxial with respect to the sprocket rotation axis and which are arranged with axial spacing from each other and which have different numbers of teeth which are constructed for positive-locking engagement with a bicycle chain, have features as are claimed herein. For implementing the advantages of the sprocket having the largest diameter mentioned in the claims, important aspects may involve characteristics besides the implementation of the gear range packing coefficient mentioned in the introduction. The use of the sprocket which has the largest diameter and which is described in the features of the claims makes it easier to implement a bicycle rear wheel sprocket arrangement with the values mentioned for the gear range packing coefficient. Therefore, the present invention also relates to a bicycle rear wheel sprocket arrangement which can be rotated about a pinion rotation axis and which has a plurality of sprockets which are coaxial with respect to the sprocket rotation axis and which are arranged with axial spacing from each other and which have different numbers of teeth which are constructed for positive-locking engagement with a cycle chain, wherein the pinion arrangement has features of the claimed characteristics.

In an embodiment, a bicycle rear wheel drive arrangement is provided having a bicycle rear wheel sprocket arrangement which is constructed as described above and having a bicycle chain.

As already indicated above, there may be produced undesirable effects at the sprocket having the smallest diameter as a result of the oblique position of the chain. For example, rubbing of the chain on the axially adjacent, next-largest sprocket. In this instance, the axial guiding of the chain and therefore the limitation of the chain movement in an axial direction on the sprocket having the smallest diameter is of particular interest. That axial guiding of the chain on the sprocket having the smallest diameter can be improved and therefore the axial movability of the chain on the sprocket can be limited in that the tooth ring at least of the sprocket having the smallest diameter of the bicycle rear wheel sprocket arrangement is constructed so as to have an axial sprocket thickness which changes over a periphery in a peripheral direction between teeth and intermediate tooth spaces which are directly adjacent thereto. Consequently, there can be constructed on the sprocket axially thicker regions which then axially guide the bicycle chain when the bicycle chain meshes with the sprocket having the smallest diameter. In the axially thinner regions of the sprocket, however, there may be provided axial play between the bicycle chain and sprocket portions in order to keep friction effects which act between the bicycle chain and the sprocket small. Since the bicycle chain has a periodic structure in the longitudinal chain direction, the variable axial sprocket thickness is preferably also constructed to be periodically variable.

In order to allow an introduction of the sprocket teeth with as little loss as possible in intermediate spaces of the bicycle chain provided for this purpose and a withdrawal of the sprocket teeth out of those intermediate spaces in a similarly loss-free manner, the axial thickness of the sprocket in the region of the intermediate tooth spaces is advantageously greater than in the region of the teeth. The sprocket configured in this manner axially guides the bicycle chain advantageously only in the region of the intermediate tooth spaces while the teeth of the sprocket in the force-transmitting engagement with the bicycle chain between plate pairs of the bicycle chain are used only for force transmission between the rollers of the bicycle chain and the sprocket.

The bicycle chain may be a roller chain which is known per se and which has a plurality of rollers which are arranged in an equidistant manner in the longitudinal chain direction with parallel roller rotation axes, which rollers are connected to each other alternately via pairs of parallel inner plates and outer plates, wherein each inner plate is arranged between the roller and an outer plate in the region of a roller connected thereto in the direction of the roller rotation axis.

In such a bicycle chain, it is already advantageous for reasons of weight for both the outer plates and the inner plates to have a smaller height in a longitudinal center portion than in the longitudinal end portions thereof.

In an embodiment, an arrangement of the above-mentioned connection means in order to connect two axially adjacent sprockets can be carried out advantageously in a position which is radially as far outwards as possible if the connection means are connected radially in a position so far outwards with the two axially adjacent sprockets that a radially inner edge of the longitudinal end regions of the inner plates and/or outer plates is located nearer the sprocket rotation axis than a radially outer edge of the connection means during a meshing engagement of the bicycle chain with the smaller of the two axially adjacent sprockets.

For more precise axial guiding of the bicycle chain, at least at the sprocket having the smallest diameter, substantially through the intermediate tooth space regions of the sprocket with minimal axial movement play of the bicycle chain on the sprocket, it is advantageous, at least for the sprocket having the smallest diameter, for the axial width of a roller support face of the sprocket, which support face is configured for abutting engagement with a roller of the bicycle chain in the region of an intermediate tooth space, deviates by no more than 10% from the axial dimension of an outer roller face—in relation to the axial dimension of the outer roller face—configured for abutment with the roller support face. The better the axial dimensions of the roller support face of the sprocket and the outer roller face adjoining it correspond, the more precisely the bicycle chain can be guided on the sprocket. In an embodiment, the axial width of the roller support face deviates by no more than 5%, particularly preferably by no more than 3%, from the axial dimension of the outer roller face.

During a meshing engagement with the at least one sprocket, in particular the sprocket having the smallest diameter, an inner plate pair generally has an internal inner plate which is located axially nearer the axial end of the sprocket arrangement with the sprocket having the largest diameter and has an external inner plate which is located axially nearer the axial end of the sprocket arrangement with the sprocket having the smallest diameter. Longitudinal center portions of the internal and external inner plate of the inner plate pair are then located in the longitudinal chain direction between two rollers which are directly connected to that inner plate pair, wherein an introduction portion of a tooth is introduced between the longitudinal center portions, and is withdrawn again during a torque transmission from the bicycle chain to the sprocket which meshes therewith.

In order to prevent undesirable friction between the introduction portion of a tooth and the bicycle chain, in particular in the region of the axially nearer internal plates of the inner plate pairs, in an embodiment at least one tooth, for example a plurality of teeth, preferably for all the teeth, of the sprocket having the smallest diameter, that the axial width of the introduction portion of the at least one tooth is smaller than a clear axial width of the longitudinal center portions of the external and internal inner plates from each other so that, during the torque transmission, the end face directed away from the sprocket having the largest diameter, with respect to the introduction portion which is introduced between the longitudinal center portions, is arranged to be separated by an axial gap from the longitudinal center portion of the external inner plate of the inner plate pair, which inner plate is axially opposite it.

In order to ensure that at least the sprocket having the smallest diameter axially guides the bicycle chain which meshes with the respective sprocket only in the peripheral portions between directly successive teeth (intermediate tooth spaces), and in order to further prevent undesirable friction and therefore power losses during riding of the bicycle, the axial sprocket width in the region of the tooth base is preferably smaller radially inside the introduction portion than the clear axial width between the edges of the parallel inner plates of each inner plate pair in the longitudinal center portion(s), which edges face the sprocket rotation axis, so that an edge of the longitudinal center portion of the external inner plate, which edge faces the sprocket rotation axis, is also arranged to be separated during the torque transmission by a gap from a tooth base of an introduction portion which is introduced between them.

In order to achieve the advantageous effects in conjunction with the sprocket having the smallest diameter, various important aspects are provided beyond the characteristics described with the use of the previously described sprocket having the largest diameter and the implementation of the values of the gear range packing coefficient described in the introduction so that the present invention also relates to a bicycle rear wheel drive arrangement having a bicycle rear wheel sprocket arrangement and having a bicycle chain, wherein the tooth ring at least of the sprocket having the smallest diameter of the bicycle rear wheel sprocket arrangement is constructed so as to have an axial sprocket thickness which changes, in particular which changes periodically, over a periphery in a peripheral direction between teeth and intermediate tooth spaces which are directly adjacent thereto, wherein the axial thickness of the sprocket is greater in the region of the intermediate tooth spaces than in the region of the teeth, where applicable with the inclusion of the characterising features of various claims made herein.

The embodiments described herein may relate to a bicycle drive arrangement having a bicycle rear wheel sprocket arrangement or a bicycle rear wheel drive arrangement, in particular having a rear wheel sprocket arrangement, as described above and/or having a rear wheel sprocket arrangement as described above and having precisely one front chain ring which is nearer the tread crank, wherein the chain ring has a technically effective number of teeth between 30 and 40, preferably between 34 and 36, with the limits mentioned being included. The "effective" number of teeth is the number of teeth of the chain ring itself in the case of a chain ring connected directly to the tread cranks. If, however, the chain ring is connected to the tread cranks via a gear arrangement, for example, a planet gear, the effective number of teeth of the chain ring results from the actual number of teeth of the chain ring taking into consideration the transmission ratio of the gear arrangement provided in the force path between the tread cranks and tooth ring of the chain ring. The effective number of teeth of a chain ring which is connected to the tread cranks by means of a gear arrangement is the number of teeth which a chain ring which is connected directly—therefore, without a gear arrangement being interposed—to the tread cranks and which brings about an identical torque transmission from the tread cranks to the same rear wheel sprocket would have.

With the rear wheel sprocket arrangement, that is to say, with the number of sprockets present therein and the respective number of teeth thereof, objective technical circumstances are provided for travel operation in the most optimised manner possible, such as, for example, the possible transmission bandwidth and the graduation of the individual adjustable transmission ratios.

However, physical/individual characteristics of the individual cyclist are extremely different. Even cyclists with substantially the same tread power can produce different tread frequencies and different tread forces while they output the same tread power.

The individualised adaptation of the objective technical transmission circumstances provided by the rear wheel sprocket arrangement is consequently carried out advantageously by associating a chain ring taking into consideration the physical preferences of the respective cyclist with the rear wheel sprocket arrangement. For the above-described rear wheel sprocket arrangement, consequently, a chain ring having a technically effective number of teeth between 30 and 40 forms a large number of individual preferences of different cyclists, such as, for example, tread frequencies and the like. Consequently, a bicycle can very readily be constructed by provision with the rear wheel sprocket arrangement according to the invention in principle for a specific bandwidth of transmission ratios and a similarly determined graduation there-between, and individualised by the selection only of the suitable chain ring for the respective type of rider.

In comparison with the currently leading single derailleur chain switching system "XX1", for example, the rear wheel sprocket having the largest diameter of the sprocket arrangement according to embodiments described herein may have eight more teeth and the chain ring may have at least four more teeth. Consequently, not only is an even smaller transmission ratio achieved between the tread crank and rear wheel, but furthermore the maximum occurring tensile loading of the bicycle chain can be substantially reduced with the drive power otherwise being the same by using sprockets and chain rings which generally have larger diameters.

Furthermore, in the case of an unchanged sprocket having the smallest diameter, an even greater—in comparison with the prior art—maximum transmission ratio can also be adjusted as a result of the above-mentioned increase of the number of teeth of the chain ring with respect to the prior art (e.g. "XX1"). Sprocket wheel construction may allow post-processing and further processing in a particularly simple, time-saving and advantageous manner. In an embodiment, a sprocket wheel can be stacked on another sprocket wheel of the same configuration in such a way that the first area of the first main surface of the sprocket wheel rests over an extended area on the first area of the second main surface of the other sprocket wheel, and that the second area of the first main surface of the sprocket wheel rests over an extended area on the second area of the second main surface of the other sprocket wheel.

Figure 2:
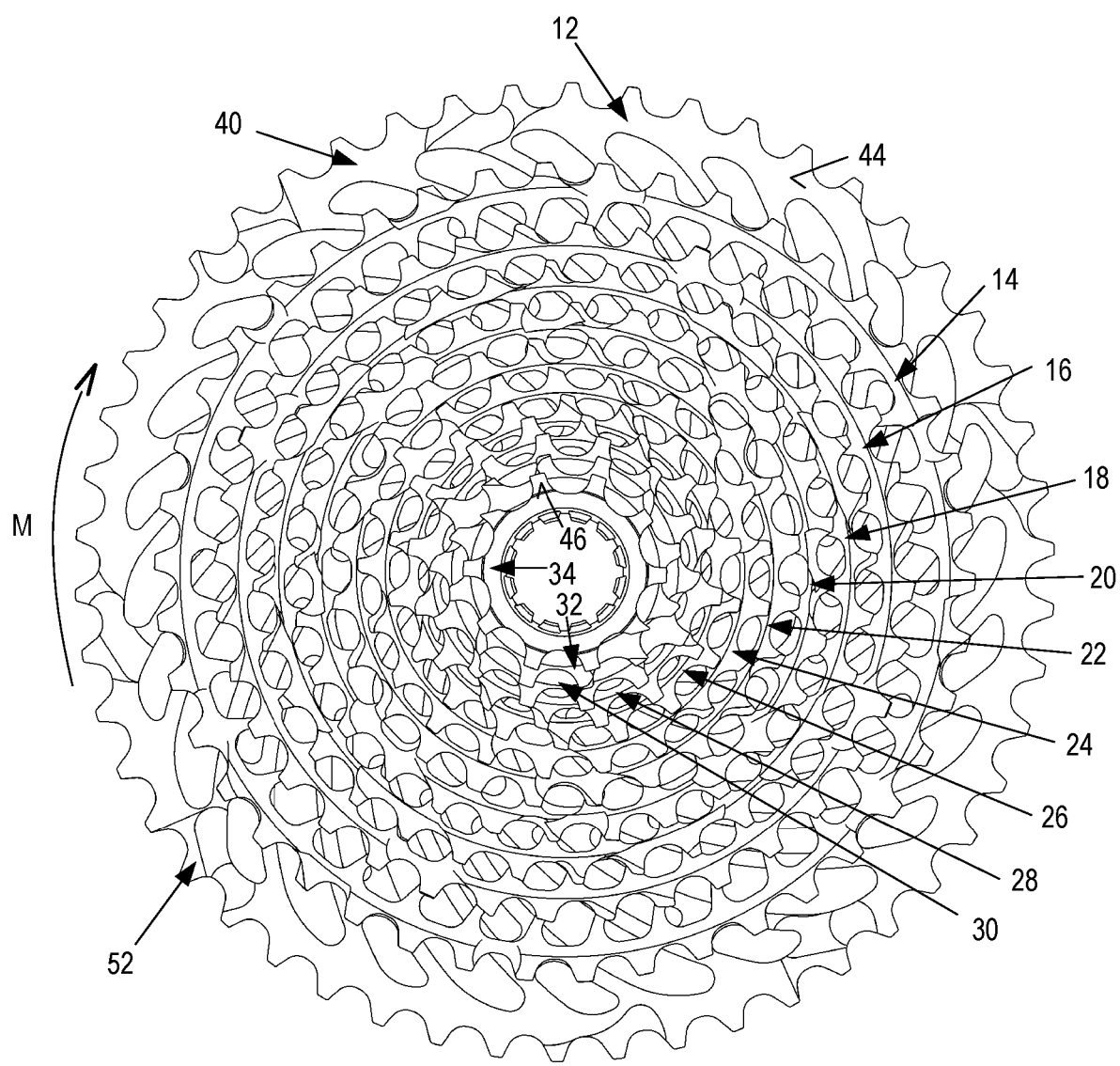
FIG. 2 is an axial front view of the sprocket arrangement of FIG. 1.
Figure 3:
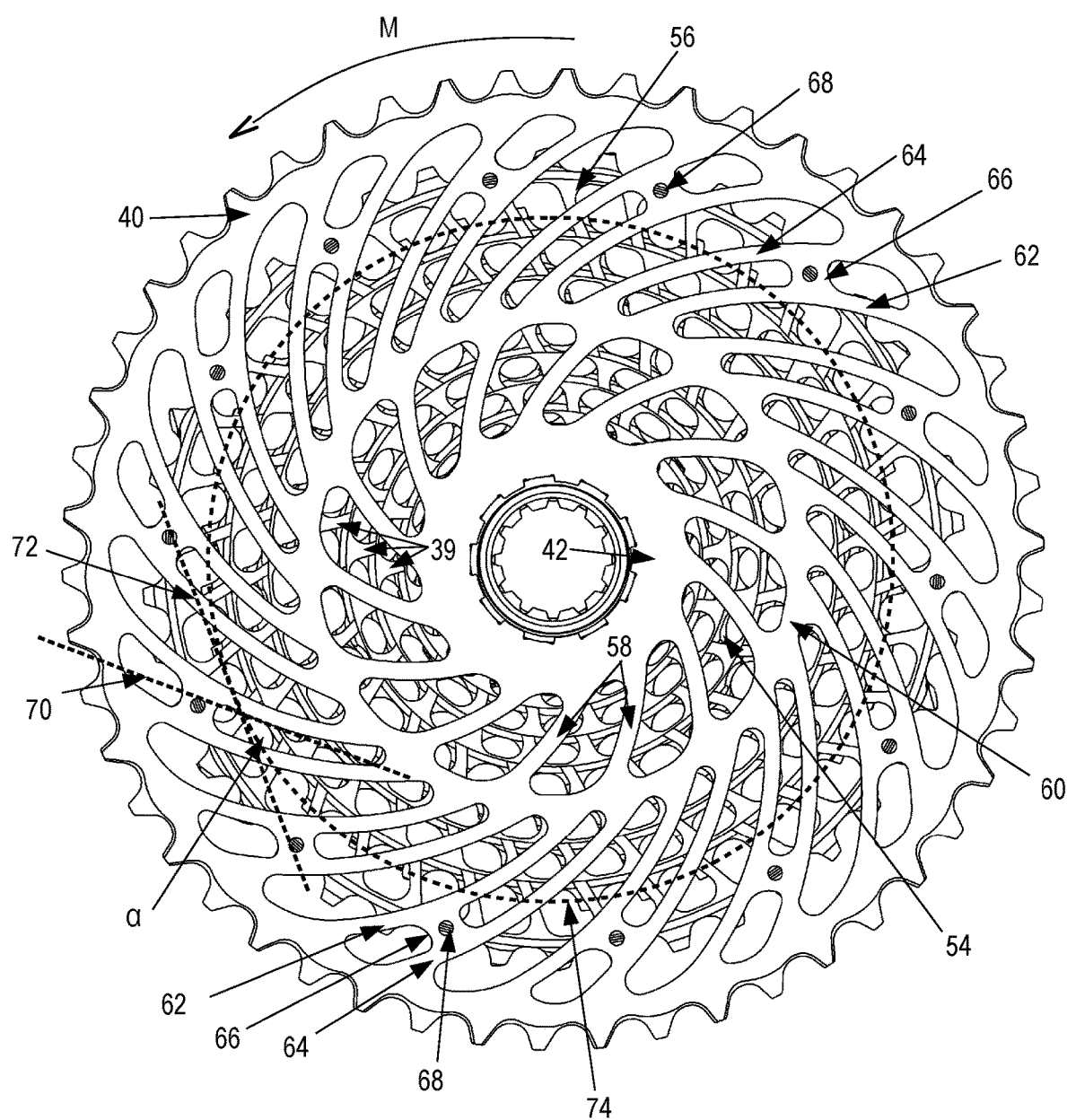
FIG. 3 is an axial rear view of the sprocket arrangement of FIGS. 1 and 2.

In FIGS. 1 to 3, an embodiment of a bicycle rear wheel sprocket arrangement is generally designated 10. The sprocket arrangement 10 has in the example illustrated 12 sprockets which are designated 12 to 34. The sprocket having the largest diameter in this instance has the reference numeral 12, the next-smallest sprockets which follow in the direction of the sprocket axis R have the reference numerals 14 to 34, wherein the sprocket having the smallest diameter of the sprocket arrangement 10 is designated 34.

In this instance, the sprockets 14 to 34 are constructed as a sprocket dome 36 in a materially coherent, integral manner. The sprocket dome 36 is supported on a dome carrier 38 which can be connected to a bicycle hub which is not illustrated. Only the sprocket 12 having the greatest diameter is constructed separately from the remaining 11 sprockets 14 to 34.

In this embodiment, the sprocket 34 having the smallest diameter has 10 teeth and the sprocket 12 having the largest diameter has 50 teeth. From the sprocket 34 having the smallest diameter to the sprocket 12 having the largest diameter, the sprockets of the sprocket arrangement 10 have the following numbers of teeth: 10-12-14-16-18-21-24-28-32-36-42-50. Consequently, the largest percentage increase in the number of teeth occurs from the smallest sprocket 34 to the next largest sprocket 32. That increase in the number of teeth is 20% in relation to the number of teeth of the sprocket 34 having the smallest diameter. All the remaining increases in the number of teeth from one sprocket to the next-largest sprocket are smaller than 20% in percentage terms. A fine graduation of the transmission ratios which can be provided with the sprocket arrangement 10 is thereby achieved.

The gear range quotient of the sprocket arrangement 10 is consequently 50:10=5.

The integral construction of the sprocket dome 36 will be explained by way of example below with reference to the axially directly adjacent sprockets 24 and 26:

An axial gap 37 which is bridged by a web 39 is provided between the sprockets 24 and 26. The web 39 is integrally constructed both with the sprocket 24 and with the sprocket 26. The web 39 may be constructed, for example, by material regions which were originally located before and after the web in a peripheral direction being removed, for example, by milling, so as to leave the web.

As can be seen in particular in the example of the sprocket 26, in which the plane of section of FIG. 1 cuts through a tooth, the web 39—as are also all the remaining webs 39 of the sprocket dome 36—is connected at a peripheral position to the smaller sprocket 26, at which a tooth is also constructed. This allows a construction of the web 39 in the position radially as far outwards as possible, which generally increases the rigidity of the sprocket dome 36. All the sprockets 14 to 34, which are integrally coherent in the same manner, of the sprocket dome 36 have a solid tooth ring 35, on which the teeth of the respective sprocket and the webs 39 are constructed.

As is typical for sprockets, the sprocket 12 having the largest diameter also has in a radially outermost position a tooth ring 40 which is preferably solid in a peripheral direction and, in a radially innermost position, a hub region 42 which is also solid preferably in a peripheral direction. The tooth ring 40 is constructed to move into meshing engagement with a bicycle chain in order to transmit torque by means of the bicycle chain (not shown in FIGS. 1 to 3 from the tread cranks (also not illustrated) of a bicycle to the sprocket arrangement 10.

The hub region 42 is used to transmit torque from the sprocket arrangement 10 to the rear wheel hub which is not illustrated in the Figures and therefore to the rear running wheel of the bicycle which is not illustrated.

In order to change the sprocket which meshes with the bicycle chain which is not illustrated, the sprocket arrangement 10 cooperates with a ratchet gear which is also not illustrated in the Figures. The ratchet gear is moved in this instance with a travel path which has an axial component in the direction of the sprocket rotation axis R, beyond the axial extent range of the sprocket arrangement 10. The axial positions of the ratchet gear relative to the sprocket arrangement 10, at which the ratchet gear remains near the chain-guiding sprocket, are orientated towards the front faces of the sprockets. In the present example, the front faces are orientated orthogonally relative to the sprocket rotation axis R wherein the radially outermost front face is intended to be used on each sprocket. In this instance, the front face is the radially outermost front face portion of a sprocket, which portion is orthogonal to the sprocket rotation axis R and is located at the front side directed towards the next-smallest sprocket or, in the case of the sprocket 34 having the smallest diameter, at the front side directed away from the sprocket 12 having the largest diameter.

In the case of the sprocket 12 having the largest diameter, the front face 44 is constructed at the front side of the tooth ring 40 directed towards the sprocket 34 having the smallest diameter. In the case of the sprocket 34 having the smallest diameter, the front face 46 thereof is constructed at the tooth flanks at the front side of the sprocket 34 directed away from the sprocket 12 having the largest diameter.

The axial spacing A between the front faces 44 and 46 of the sprocket 12 having the largest diameter or the sprocket 34 having the smallest diameter is 40.5 mm in the example illustrated.

Therefore, the packing density quotient of the sprocket arrangement 10 is 12:40.5=0.296.

Therefore, the gear range packing coefficient of the sprocket arrangement 10 is 5×0.296=1.48.

With the sprocket arrangement 10, therefore, it is possible to manage with only a single chain ring on the tread cranks even on a mountain bike which is constructed for very steep gradients. In this instance, a single chain ring having an effective number of teeth in the range from 30 to 40 teeth is preferably used. Consequently, a speed step-down is brought about from the chain ring to the sprocket 12 having the largest diameter and a speed step-up is brought about from the chain ring to the sprocket 34 having the smallest diameter. As a result of the always-valid energy conservation, torque is stepped up from the chain ring to the sprocket 12 having the largest diameter and is stepped down with respect to the sprocket 34 having the smallest diameter. The step-up and step-down are referred to in the present application with the general term "transmission".

In order to be able to produce the above-mentioned spacing A between the front faces 44 and 46 in the region of the tooth rings of the sprockets 12 to 34 without a similarly large axial spacing having to be provided for the assembly of the sprocket arrangement 10 in the region of the rear wheel hub, that is to say, for instance at the hub region 42 of the sprocket 12, the sprocket 12 having the largest diameter in the example illustrated has an angled portion 47 substantially in the region of the radial center thereof (always measured from the sprocket rotation axis R). Therefore, a sprocket region of the sprocket 12 having the largest diameter, which region is located radially inside the angled portion 47, is nearer the sprocket 34 having the smallest diameter than a sprocket region of the sprocket 12 located radially outside the angled portion 47.

As can further be seen in FIG. 1, the sprocket 12 having the largest diameter is supported with the front face 44 thereof on axial projections 48 of the next-smallest sprocket 14 which is directly axially adjacent thereto. The axial projections 48 are constructed in the example illustrated in an integral materially cohesive manner with the sprocket 14. However, this does not have to be the case. In place of the integral axial projections 48, there may also be provided between the sprockets 12 and 14 axial spacers which are constructed separately from the sprockets 12 and 14 in order to bridge the axial gap 50 present between those sprockets.

FIG. 2 is a front view in a viewing direction along the sprocket rotation axis R towards the sprocket arrangement 10 of FIG. 1. Consequently, the viewer is looking at FIG. 2 towards the front faces 44 and 46 of the sprocket 12 having the largest diameter or the sprocket 34 having the smallest diameter and towards all the front faces of the remaining sprockets 14 to 32, but which are not indicated in greater detail in FIG. 2. FIG. 2 shows front-end indentations or recesses 52 in the front face 44 of the sprocket 12 having the largest diameter. Those recesses 52 act as an auxiliary switching means during switching from the sprocket 14 to the larger sprocket 12.

FIG. 3 is a rear view in a viewing direction opposite the viewing direction of FIG. 2. Therefore, FIG. 3 shows some details of the structural configuration of the sprocket 12 having the largest diameter, which details promote the configuration of the sprocket arrangement 10 with the gear range packing coefficient demonstrated.

As FIG. 2 has already shown, the sprockets 14 to 34 of the sprocket dome 36 are produced using a skeleton construction, that is to say, with solid radially outer tooth rings, on which the teeth and intermediate tooth spaces are formed, and with the spoke-like webs 39 radially inside the tooth rings.

Thus, the sprocket 12 having the largest diameter is also formed radially externally between the solid tooth ring 40 and the similarly solid hub region 42 radially internally so as to have sprocket spokes in order to reduce the weight of the sprocket 12 having the largest diameter without substantial losses of rigidity.

In the present example, the sprocket 12 having the largest diameter has a radially internal spoke region 54 and a radially external spoke region 56. The radially internal spoke region 54 has a smaller number of sprocket spokes 58 than the radially external spoke region 56. The radially internal and the radially external spoke region 54 and 56 are delimited from each other by a solid intermediate ring region 60 which is preferably constructed in an annular manner around the sprocket rotation axis R. The construction of the intermediate ring region 60 allows the different number of sprocket spokes in the spoke regions 54 and 56.

As a comparison of FIGS. 1 and 3 with each other shows, the angled portion 47 is constructed in the solid intermediate ring region 60 so that the angled portion is completely constructed in a radial region of solid material. It is thereby possible for the sprocket spokes to be constructed at both sides of the angled portion 47 or at both sides of the intermediate ring region 60 as planar sprocket spokes, which is advantageous for the rigidity and dimensional stability thereof under load.

In order to differentiate them from the sprocket spokes 58 of the radially internal spoke region 54, the sprocket spokes of the radially external spoke region 56 are designated 62 and 64.

The drive rotation direction of the sprocket arrangement 10 and therefore of the sprocket 12 having the largest diameter is designated M in FIGS. 2 and 3.

In this instance, every second sprocket spoke 62 of the outer spoke region 56 is connected to the sprocket spoke 64 which leads it directly in a drive rotation direction M by a connection strut 66. The rigidity of the sprocket 12 having the largest diameter is increased by that connection strut 66 over-proportionally relative to the increase in weight connected therewith. Consequently, the sprocket spokes 62 are connection spokes in the sense of the above introduction to the description. In order to avoid an unnecessary weight increase, the sprocket spokes 64 are not connected with connection struts to the sprocket spokes 62 which lead them directly in the drive rotation direction M.

The connection struts 66 are preferably located on a circle whose center is the sprocket rotation axis R. The connection struts 66 are further located on the sprocket 12 in the radially outermost position but within the radial extent range of the axially directly adjacent, next-smallest sprocket 14. The next-smallest sprocket 14 and with it the sprocket dome 36 can thereby be or become mechanically connected at the connection struts 66 to the sprocket 12 having the largest diameter.

The axial projections 48 previously mentioned in connection with FIG. 1 are preferably supported with the end faces thereof directed away from the sprocket 14 on the sides of the connection struts 66 facing them. In a particularly advantageous manner, pins 68 which may be integrally formed with the axial projections 48 thereon extend through the connection struts 66 in the example illustrated. By means of those pins 68 acting as connection means, the sprocket 12 having the largest diameter is connected so as to transmit torque and axial force to the next-smallest sprocket 14 and therefore to the entire sprocket dome 36.

As can very clearly be seen in FIG. 3, all the sprocket spokes 58, 62 and 64 of the sprocket 12 having the largest diameter are constructed on that sprocket 12 in such a manner that the radially inner longitudinal ends thereof are leading with respect to the radially outer longitudinal ends of the same sprocket spoke in the drive rotation direction M. A preponderant compression or pressure loading of the individual sprocket spokes 58, 62 and 64 is thereby achieved during a torque transmission from a bicycle chain to the rear wheel hub.

Not only do the radially inner longitudinal ends of a sprocket spoke lead the radially outer longitudinal end of the same spoke but in addition the sprocket spokes 58, 62 and 64 may be constructed not to be straight but instead curved. The curvature of the sprocket spokes 58, 62 and 64 is brought about in this instance about curvature axes which are parallel with the sprocket rotation axis R and which follow the curved sprocket spoke in a drive rotation direction M. Therefore, the sprocket spokes 58, 62 and 64 are curved in a concave manner when viewed in the drive rotation direction M and are curved in a convex manner when viewed counter to the drive rotation direction M. As a result of this curvature, in the event of a torque transmission from the tooth ring 40 to the hub region 42 and therefore to the rear wheel hub, there is achieved in the sprocket spokes 58, 62 and 64 a particularly advantageous stress loading which is primarily formed by pressure stresses. The pressure resistance of a sprocket spoke is many times greater than the tensile resistance or shearing resistance thereof.

Furthermore, the curvature mentioned causes the angle α, which a tangent 70 located in the sprocket plane of the sprocket 12 on a sprocket spoke 58, 62 or 64 encloses with a tangent 72 also located in the sprocket plane on a reference circle 74 with the sprocket rotation axis R as the center, to be increasingly great the smaller the radius of the reference circle is. Preferably, all the angles between spoke tangents and reference circle tangents are of the same size for one and the same reference circle at all the sprocket spokes cut by this reference circle. In principle, the angle condition described in this instance could also be complied with by sprocket spokes in the form of polygons. However, the above-described curved construction of the sprocket spokes may be preferable in order to prevent stress peaks in corner regions or bent regions of sprocket spokes in the form of polygons.

Figure 4:
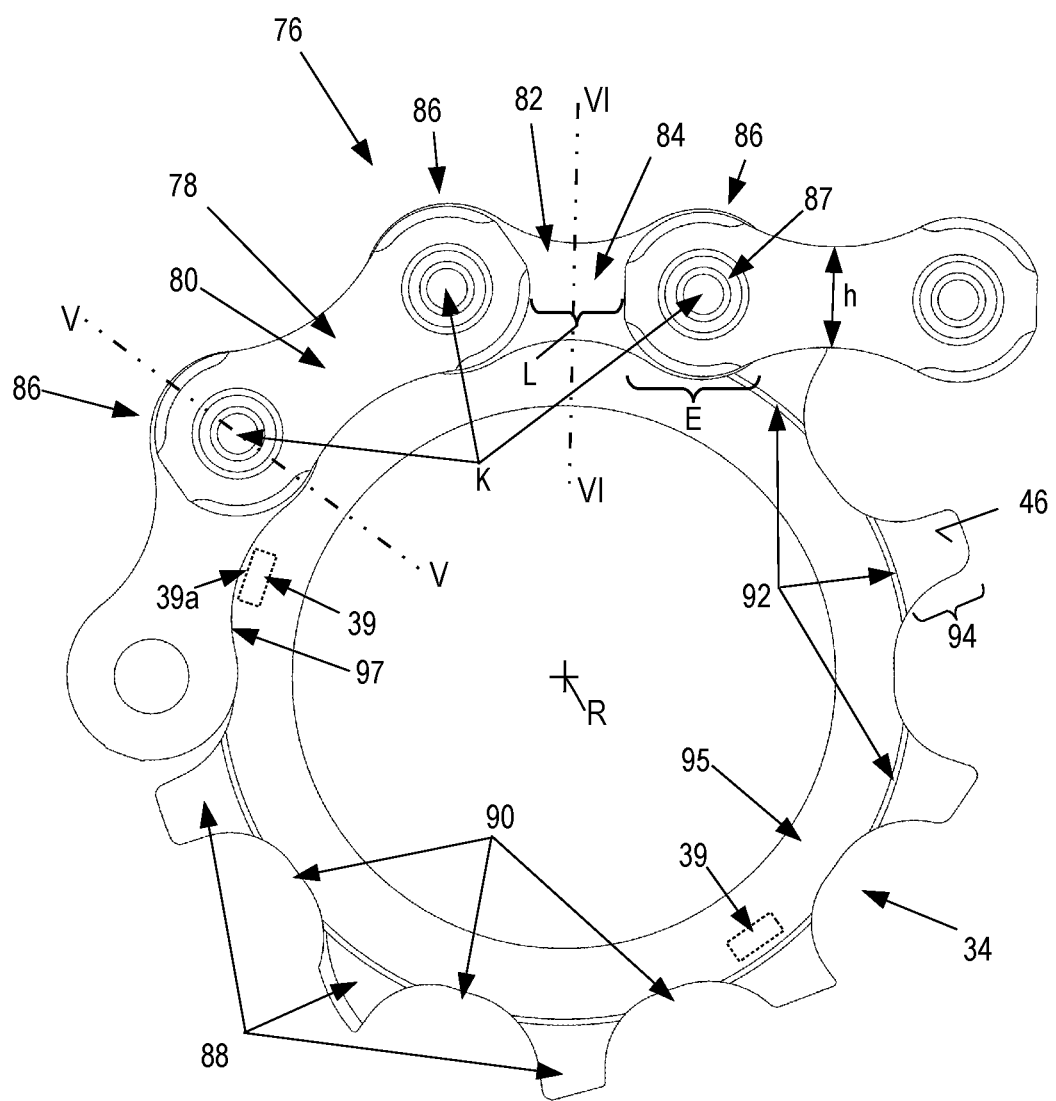
FIG. 4 is an axial view of the sprocket having the smallest diameter of the sprocket arrangement of FIGS. 1 to 3.

FIG. 4 is a front view of the sprocket 34 having the smallest diameter when viewed in an axial direction. Consequently, the sprocket rotation axis R is orthogonal to the plane of the drawing of FIG. 4 and the sprocket 12 which has the largest diameter and which is not illustrated in FIG. 4 and all the other sprockets 14 to 32 are behind the plane of the drawing of FIG. 4.

FIG. 4 illustrates a portion of a bicycle chain 76 which meshes with the sprocket 34 having the smallest diameter. The bicycle chain 76 has pairs 78 of outer plates and pairs 82 of inner plates in an alternating manner over the course thereof. In FIG. 4, the viewer is looking towards the external outer plate 80, that is to say, the plate located further away from the sprocket 12 having the largest diameter. Similarly, the viewer is looking towards the external inner plate 84 in the inner plate pair 82. Furthermore the outer plate pairs 78 and inner plate pairs 82 which are successive in an alternating manner in the longitudinal chain direction are connected to each other so as to be rotatable relative to each other about a chain link axis K. The chain link axes K of each connection between successive outer plate pairs 78 and inner plate pairs 82 are ideally parallel with the sprocket rotation axis R during meshing engagement with the sprocket 34. Furthermore, the chain link axes K are rotation axes of rollers 86 which are received between the respective plate pairs 78 and 82. However, the rollers 86 are hidden in FIG. 4 by the outer plates 80 and 84, respectively, and can be seen only in FIGS. 5 and 6.

Sprocket teeth 88 which are arranged so as to be distributed equidistantly at the periphery of the sprocket 34 engage in the intermediate spaces between two rollers 86 which are successive in the longitudinal chain direction in order to transmit torque between the bicycle chain 76 and the rear running wheel. In this instance, the rollers 86 are positioned on the sprocket 34 in the region of the intermediate tooth spaces 90 between teeth 88 which are directly successive in a peripheral direction.

Of the teeth 88, only an introduction portion 94 is introduced, during meshing engagement with the bicycle chain 76, into the intermediate space between two plates of one and the same plate pair and is withdrawn therefrom again. As will be further illustrated in detail in connection with the following FIGS. 5 and 6, the introduction portion 94 is constructed to be less wide in an axial direction than a support portion 95 of the sprocket 34 located radially inside the introduction portions. At the transition between the axially thicker support portion 95 and the axially thinner introduction portion 94, there is located an axial step 92 which further indicates the position of the respective tooth base. The axial step 92 may be constructed as a chamfer which is inclined in an axial direction away from the sprocket 12 having the largest diameter towards the sprocket rotation axis R.

FIG. 4 indicates on the inner plate pair 82 a longitudinal center portion L of the inner plate pair 82 and therefore of the external inner plate 84 and the internal inner plate opposite it in an axial direction.

The plates of the inner plate pairs 82 and the outer plate pairs 78 have a smaller plate height h in the longitudinal center portion L thereof than in the longitudinal end regions E thereof. Consequently, a web 39 for connection to the next-largest sprocket 32 (indicated by the broken-line rectangle 39 in FIG. 4) at the peripheral location of a tooth 88 may be provided in such a radially outer position that the radially outer edge 39a thereof is further away from the sprocket rotation axis R than an edge 97 of a plate in the region of the longitudinal end regions E thereof, which edge 97 faces the sprocket rotation axis R.

Figure 5:
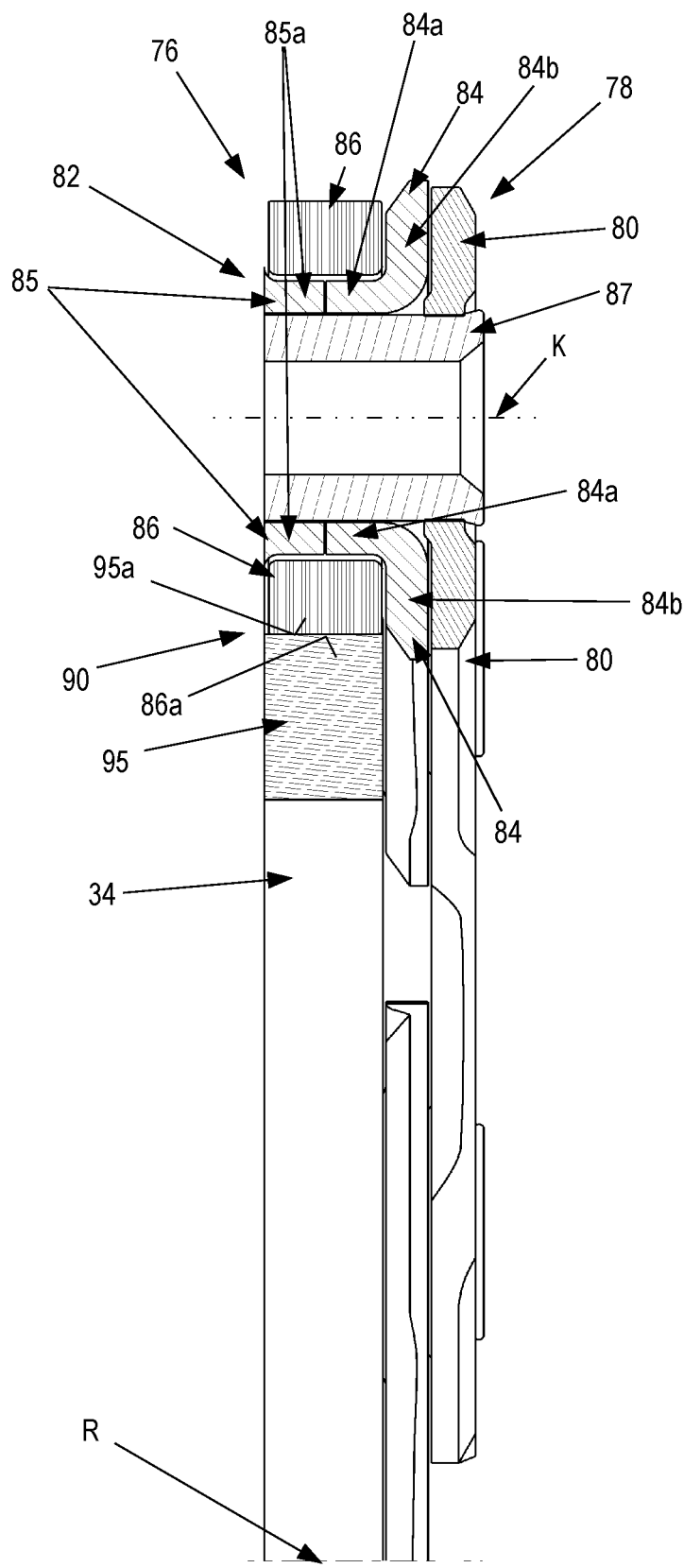
FIG. 5 is a longitudinal sectioned view through the sprocket having the smallest diameter of FIG. 4 along the plane of section V-V which contains the sprocket rotation axis.

FIG. 5 is a cross-section of the engagement situation of the sprocket 34 with the chain 76 in the plane of section V-V which contains the sprocket rotation axis R. The cross-section shown in FIG. 5 further extends through the chain link axis K and therefore through a roller 86 of the bicycle chain 76.

FIG. 5 shows how the support portion 95 of the sprocket 34 axially leads the bicycle chain 76 in the region of an intermediate tooth space 90 and consequently limits the axial movability thereof along the sprocket rotation axis R. In this instance, a roller 86 is preferably positioned with the outer face 86a thereof on a corresponding support face 95a of the support portion 95 directed in a radial direction, wherein the support portion 95, at least in the support region of the support face 95a thereof which is constructed for abutment of an outer roller face 86a, deviates from the axial width of the roller 86 which abuts it in the event of engagement in terms of the axial width thereof by no more than 10%, preferably no more than 5%, particularly preferably by no more than 3%. The axial width of the roller 86 is the reference variable for the percentage deviation.

The view of FIG. 5 shows a portion of an internal inner plate 85 which axially retains the roller 86 between the inner plate pair 82 together with the external inner plate 84. The chain link which is formed along the roller axis of the roller 86 which coincides with the chain link axis K comprises a chain rivet 87 which connects the plate pairs which meet each other at the chain link and which comprise the outer plate pair 78 and inner plate pair 82 to each other in an axial direction, but allows a relative rotation about the chain link axis K as the only relative movement.

The inner plates 84 and 85 each have in the longitudinal section of FIG. 5 an axial member 84a and 85a which is surrounded by the roller 86 and have a radial member 84b and 85b (not illustrated), between which the roller 86 is axially chamfered. Consequently, the radial members 84b and 85b of the inner plates 84 and 85 are opposite the front sides of the roller 86. It is the radial members 84b and 85b of the inner plates 84 and 85 which also bring about axial fixing of the bicycle chain 76 to the sprocket 34 in conjunction with the support portion 95. The radial members are discs and the axial members are sleeves in terms of the three-dimensional shape thereof.

Figure 6:
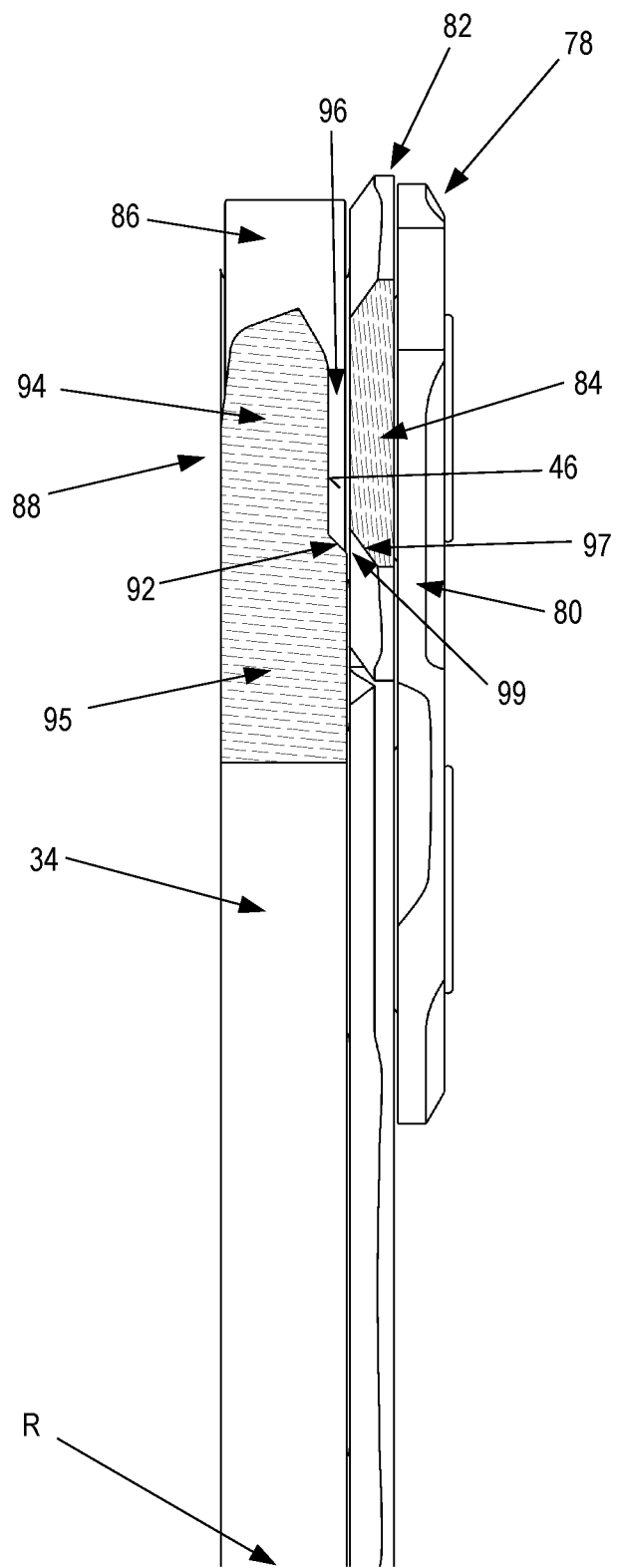
FIG. 6 is a longitudinal sectioned view through the sprocket having the smallest diameter of FIG. 4 along the plane of section VI-VI which contains the sprocket rotation axis.

FIG. 6 is a longitudinal section in the plane of section VI-VI which contains the sprocket rotation axis R. That plane of section intersects with the longitudinal center portion L of an inner plate pair 82 and intersects with the tooth 88 of the sprocket 34 introduced into that longitudinal center portion L.

The roller 86 shown in FIG. 6 adjoins the tooth which leads the cut tooth 88 of FIG. 6 and transmits torque thereto. A roller which adjoins the cut tooth 88 of FIG. 6 for the purpose of torque transmission is in front of the plane of the drawing of FIG. 6 and is therefore not illustrated.

As can be seen in FIG. 6, the axial width of the introduction portion 94 of the tooth 88 has smaller dimensions than the clear width of the longitudinal center portion L of the inner plate pair 82 so that the side of the introduction portion 94 having the front face 46—that is to say, the side directed away from the sprocket 12 having the largest diameter—is located with spacing from the external inner plate 84 of the inner plate pair 82 opposite it. Consequently, an axial gap 96 is provided between the introduction portion 94 and the external inner plate 84 axially opposite it. This axial gap 96 ensures the axial movability which the bicycle chain 76 requires in order to be switched to the next-largest sprocket. Therefore, a movability which is sufficient for switching is achieved in respect of the chain 76 in cooperation with the above-described, axial guiding of the bicycle chain 76 in the intermediate tooth spaces 90 without an undesirable rubbing contact of the chain 76 with the next-largest sprocket being produced as a result of excessively oblique running of the chain 76.

FIG. 6 further illustrates that an edge 97 of the external inner plate 84 directed towards the sprocket rotation axis R is arranged with spacing from the step 92 so that there is also a gap 99 between the step 92 and the edge 97 of the external inner plate 84 nearer the sprocket rotation axis R. Consequently, at least the external inner plate 84 of the inner plate pair 82 has no contact with the tooth 88 which engages between the inner plate pair 82. Consequently, the tooth 88 is advantageously used only or practically only for transmitting torque between the bicycle chain 76 and the sprocket 34, whereas the intermediate tooth spaces 90 can be used predominantly or even only for axially guiding the bicycle chain 76 on the sprocket 34.

As a result of this structural configuration, the bicycle chain 76 can be guided in an axially taut manner on the sprocket 34 so that the bicycle chain 76 does not touch the next-largest sprocket 32 which is axially directly adjacent to the sprocket 34 even in the presence of only a single chain ring at the tread crank side and the associated oblique position. This is even more noteworthy since, in the twelve-fold sprocket arrangement 10 shown by way of example, the front face spacing between the sprockets 32 and 34 is very small and, for example, may be only approximately 3.6 mm.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:
1. A bicycle rear wheel sprocket arrangement which can be rotated about a sprocket rotation axis, comprising:
 a plurality of sprockets which are coaxial with respect to the sprocket rotation axis and are arranged with axial spacing from each other and have different numbers of teeth which are constructed for positive-locking engagement with a bicycle chain, the plurality of sprockets having:
  a gear range quotient which is formed by division of the number of teeth of a sprocket of the plurality of sprockets having the largest diameter by the number of teeth of a sprocket of the plurality of sprockets having the smallest diameter, and
  a packing density quotient formed by division of a number of sprockets in the sprocket arrangement by the axial spacing measured in millimeters of axially outermost sprockets from each other,
wherein the plurality of sprockets has a gear range packing coefficient, formed from a product of the gear range quotient and the packing density quotient, which is greater than 1.25 and two axially adjacent sprockets are constructed separately from each other and are connected so as to transmit torque by a plurality of connectors which bridge an axial gap existing between the adjacent sprockets; and
a bicycle roller chain having a plurality of rollers which are arranged in an equidistant manner in a longitudinal chain direction with parallel roller rotation axes, which rollers are connected to each other alternately via pairs of parallel inner plates and outer plates, wherein each inner plate is arranged between the roller and an outer plate in a region of a roller connected thereto in the direction of the roller rotation axis, and both the outer plates and the inner plates have a smaller height in a longitudinal center portion than in longitudinal end portions thereof,
wherein the plurality of connectors are connected radially in a position so far outwards with the smaller of the two axially adjacent sprockets that a radially inner edge of the longitudinal end portions of the inner plates and/or outer plates is located nearer the sprocket rotation axis than a radially outer edge of the connectors during a meshing engagement of the bicycle chain with the smaller of the two axially adjacent sprockets.

2. The bicycle rear wheel sprocket arrangement according claim 1, wherein the sprocket having the largest diameter and the sprocket which is axially directly adjacent thereto are constructed separately from each other and are connected so as to transmit the torque by a plurality of connection means which bridge the axial gap existing between the adjacent sprockets.

3. The bicycle rear wheel sprocket arrangement according claim 2, wherein a sprocket smaller than the sprocket having the largest diameter and a sprocket which is axially directly adjacent thereto are constructed integrally with each other and are connected so as to transmit torque and preferably also so as to transmit axial force by a plurality of connectors in the form of webs which bridge the axial gap existing between the adjacent sprockets.

4. The bicycle rear wheel sprocket arrangement according claim 3, wherein the connectors are connected to the smaller of the two axially adjacent sprockets in a peripheral direction at a location at which a tooth is located on the smaller of the two axially adjacent sprockets.

5. The bicycle rear wheel sprocket arrangement according claim 1, further comprising a bicycle chain, wherein the tooth ring at least of the sprocket having the smallest diameter of the bicycle rear wheel sprocket arrangement is constructed so as to have an axial sprocket thickness which changes, in particular which changes periodically, over a periphery in a peripheral direction between teeth and intermediate tooth spaces which are directly adjacent thereto, wherein the axial thickness of the sprocket is greater in a region of the intermediate tooth spaces than in a region of the teeth.

6. The bicycle rear wheel sprocket arrangement according claim 5, wherein the tooth ring at least of the sprocket having the smallest diameter of the bicycle rear wheel sprocket arrangement is constructed so as to have an axial sprocket thickness which changes periodically over a periphery in a peripheral direction between teeth and intermediate tooth spaces which are directly adjacent thereto.

7. The bicycle rear wheel sprocket arrangement according claim 6, wherein the bicycle chain is a roller chain that includes a plurality of rollers which are arranged in an equidistant manner in a longitudinal chain direction with parallel roller rotation axes, which rollers are connected to each other alternately via pairs of parallel inner plates and outer plates, wherein each inner plate is arranged between the roller and an outer plate in the region of a roller connected thereto in the direction of the roller rotation axis, and at least for the sprocket having the smallest diameter, it is the case that an axial width of a roller support face of the sprocket, which support face is constructed for abutting engagement with a roller of the bicycle chain in the region of an intermediate tooth space, deviates from an axial dimension of an outer roller face, in relation to the axial dimension of the outer roller face, constructed for abutment with the roller support face, by no more than 10%.

8. The bicycle rear wheel sprocket arrangement according claim 7, wherein each inner plate is arranged between the roller and an outer plate in the region of a roller connected thereto in the direction of the roller rotation axis, and at least for the sprocket having the smallest diameter, it is the case that the axial width of a roller support face of the sprocket, which support face is constructed for abutting engagement with a roller of the bicycle chain in the region of an intermediate tooth space, deviates from the axial dimension of an outer roller face, in relation to the axial dimension of the outer roller face, constructed for abutment with the roller support face, by no more than 5%.

9. The bicycle rear wheel sprocket arrangement according claim 8, wherein each inner plate is arranged between the roller and an outer plate in the region of a roller connected thereto in the direction of the roller rotation axis, and at least for the sprocket having the smallest diameter, it is the case that the axial width of a roller support face of the sprocket, which support face is constructed for abutting engagement with a roller of the bicycle chain in the region of an intermediate tooth space, deviates from the axial dimension of an outer roller face, in relation to the axial dimension of the outer roller face, constructed for abutment with the roller support face, by no more than 3%.

10. The bicycle rear wheel sprocket arrangement according claim 9, wherein during a meshing engagement with at least one sprocket, an inner plate pair has an internal inner plate which is located axially nearer an axial end of the sprocket arrangement with the sprocket having the largest diameter and has an external inner plate which is located axially nearer the axial end of the sprocket arrangement with the sprocket having the smallest diameter, wherein longitudinal center portions of the internal and external inner plate of the inner plate pair are located in the longitudinal chain direction between two rollers which are directly connected to the inner plate pair, wherein an introduction portion of a tooth is introduced between the longitudinal center portions and is withdrawn again during a torque transmission from the bicycle chain to the sprocket which meshes therewith, and for at least one tooth the axial width of the introduction portion of the at least one tooth is smaller than a clear axial width of the longitudinal center portions of the external and internal inner plates from each other so that, during the torque transmission, the end face directed away from the sprocket having the largest diameter in respect of the introduction portion which is introduced between the longitudinal center portions is arranged to be separated by an axial gap from the longitudinal center portion of the external inner plate of the inner plate pair, which inner plate is axially opposite it.

11. The bicycle rear wheel sprocket arrangement according claim 10, wherein the axial width of an introduction portion of at least one tooth of the sprocket having the smallest diameter is smaller than a clear axial width of the longitudinal center portions of the external and internal inner plates from each other so that, during the torque transmission, the end face directed away from the sprocket having the largest diameter in respect of the introduction portion which is introduced between the longitudinal center portions is arranged to be separated by an axial gap from the longitudinal center portion of the external inner plate of the inner plate pair, which inner plate is axially opposite it.

12. The bicycle rear wheel sprocket arrangement according claim 11, wherein in all teeth of at least the sprocket having the smallest diameter the axial width of the introduction portion of the at least one tooth is smaller than a clear axial width of the longitudinal center portions of the external and internal inner plates from each other so that, during the torque transmission, the end face directed away from the sprocket having the largest diameter in respect of the introduction portion which is introduced between the longitudinal center portions is arranged to be separated by an axial gap from the longitudinal center portion of the external inner plate of the inner plate pair, which inner plate is axially opposite it.

13. The bicycle rear wheel sprocket arrangement according claim 12, wherein an axial sprocket width in the region of a tooth base is smaller radially inside the introduction portion than the clear axial width between the longitudinal center portions of the inner plate pairs so that an edge of the longitudinal center portion of the external inner plate, which edge faces the sprocket rotation axis, is also arranged to be separated during the torque transmission by a gap from a tooth base of an introduction portion which is introduced between them.

14. A bicycle rear wheel sprocket arrangement which can be rotated about a sprocket rotation axis, comprising:
a plurality of sprockets which are coaxial with respect to the sprocket rotation axis and are arranged with axial spacing from each other and have different numbers of teeth which are constructed for positive-locking engagement with a bicycle chain, the plurality of sprockets having:
a gear range quotient which is formed by division of the number of teeth of a sprocket of the plurality of sprockets having the largest diameter by the number of teeth of a sprocket of the plurality of sprockets having the smallest diameter, and
a packing density quotient formed by division of the number of sprockets in the sprocket arrangement by the axial spacing measured in millimeters of axially outermost sprockets from each other,
wherein the plurality of sprockets has a gear range packing coefficient, formed from a product of the gear range quotient and the packing density quotient, which is greater than 1.25 and two axially adjacent sprockets are constructed separately from each other and are connected so as to transmit an axial force by a plurality of connectors which bridge an axial gap existing between the adjacent sprockets,
wherein the plurality of sprockets having a smaller diameter than the sprocket having the largest diameter form a sprocket dome.

15. The bicycle rear wheel sprocket arrangement according claim 14, wherein the sprocket having the largest diameter and the sprocket which is axially directly adjacent thereto are constructed separately from each other and are connected so as to transmit the axial force by a plurality of connection means which bridge the axial gap existing between the adjacent sprockets.

16. The bicycle rear wheel sprocket arrangement according claim 15, wherein a sprocket smaller than the sprocket having the largest diameter and a sprocket which is axially directly adjacent thereto are constructed integrally with each other and are connected so as to transmit torque and preferably also so as to transmit axial force by a plurality of connectors in the form of webs which bridge the axial gap existing between the adjacent sprockets.

17. The bicycle rear wheel sprocket arrangement according claim 16, wherein the connectors are connected to the smaller of the two axially adjacent sprockets in a peripheral direction at a location at which a tooth is located on the smaller of the two axially adjacent sprockets.

18. The bicycle rear wheel sprocket arrangement according claim 17, further comprising a bicycle chain that is a roller chain having a plurality of rollers which are arranged in an equidistant manner in a longitudinal chain direction with parallel roller rotation axes, which rollers are connected to each other alternately via pairs of parallel inner plates and outer plates, wherein each inner plate is arranged between the roller and an outer plate in the region of a roller connected thereto in the direction of the roller rotation axis, and both the outer plates and the inner plates have a smaller height in a longitudinal center portion than in longitudinal end portions thereof.

* * * * *